UNITED STATES PATENT OFFICE.

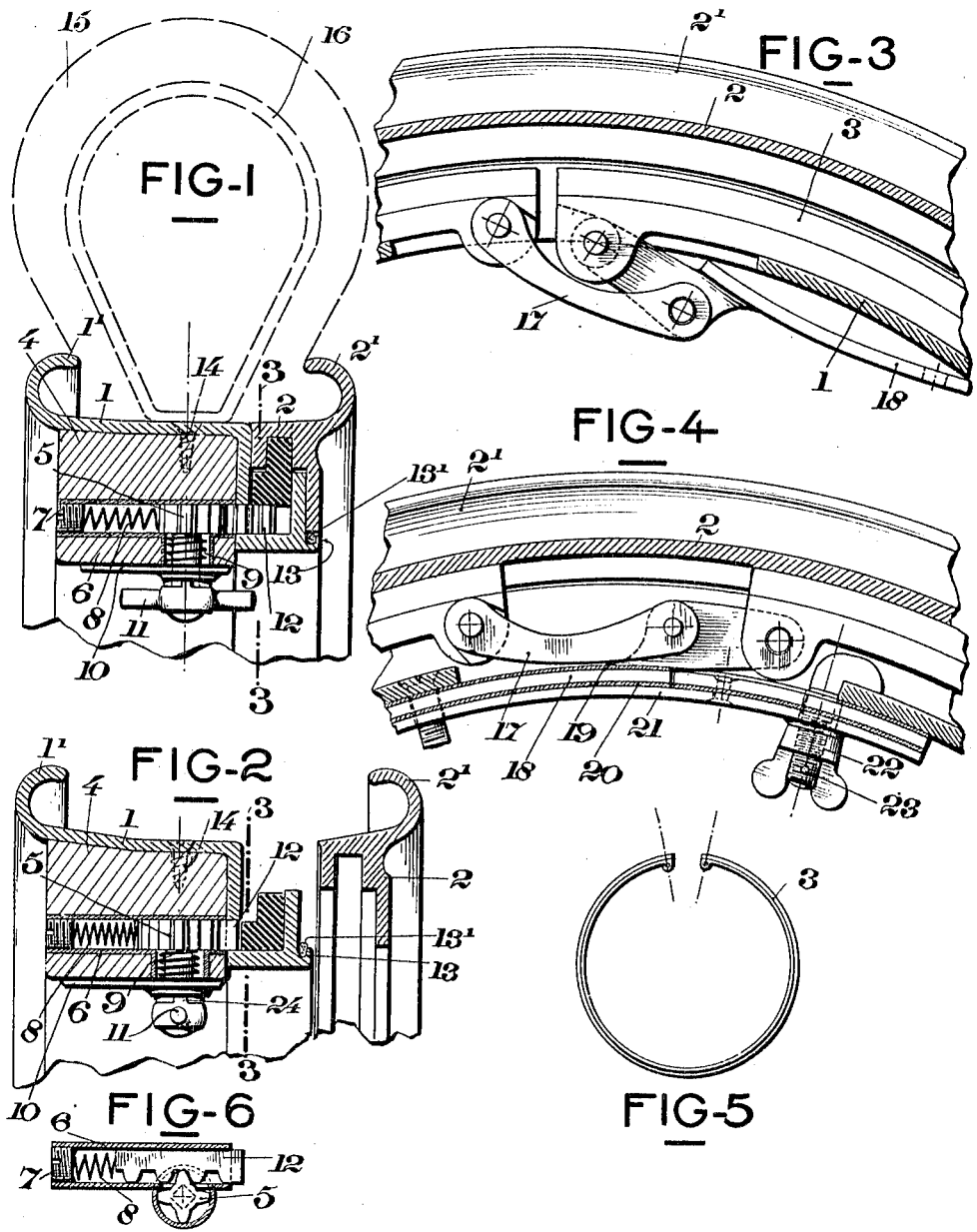

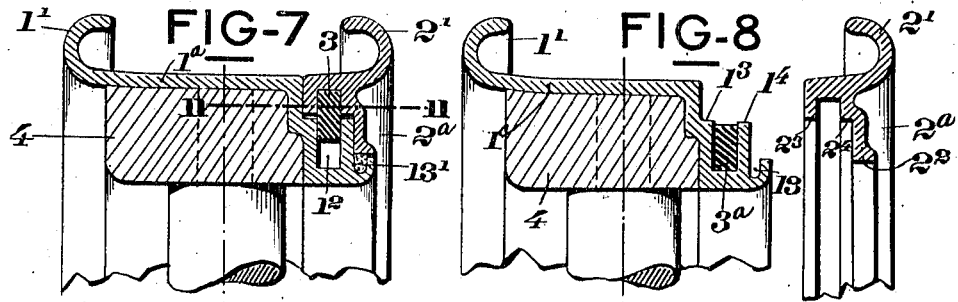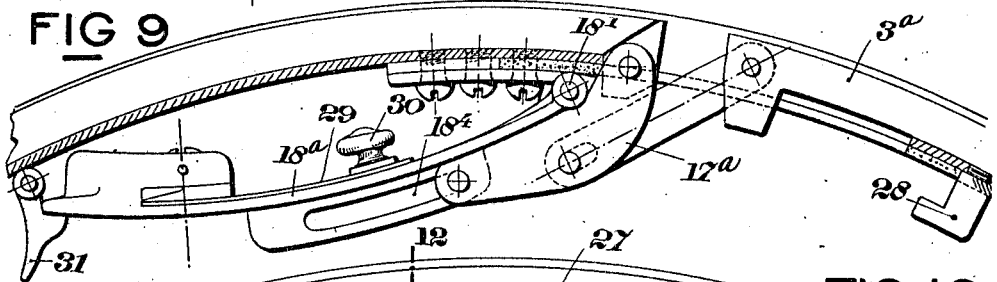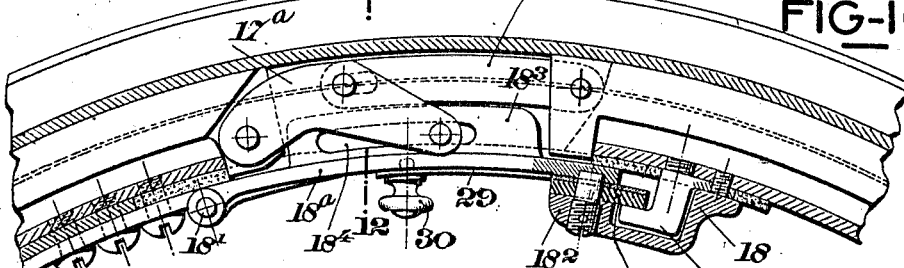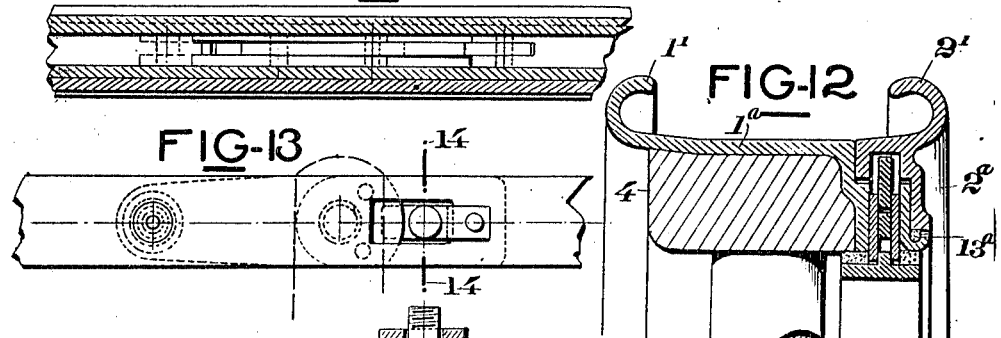

EUGENE LAURENT, OF ST. ETIENNE, LOIRE, FRANCE.

WHEEL-RIM.

1,105,524.  Specification of Letters Patent.  Patented July 28, 1914.

Application filed July 16, 1912. Serial No. 709,807.

*To all whom it may concern:*

Be it known that I, EUGÈNE LAURENT, a citizen of the Republic of France, residing at 16 Rue César Bertholon, St. Etienne, Loire, in the Republic of France, have invented certain new and useful Improvements in Wheel-Rims, of which the following is a specification.

My invention relates to rims for wheels of road vehicles, and has for its object to provide an improved separable or divisible rim which when in use will facilitate the operation of removing or replacing the wheel tire.

In order to facilitate the appreciation of my invention I have appended hereto two sheets of drawings upon which two preferred embodiments of my invention are illustrated.

Figure 1 is a section showing the mechanism of the rim with its pneumatic tire, the security bolt occupying its locking position. Fig. 2 is a similar view the tire being removed and the bolt open to permit of displacing the segment which enables the movable portion of the rim to be separated from the fixed portion. Fig. 3 is a section on the line 3—3 in Fig. 2 showing the locking mechanism of the segment in the position enabling the movable portion to be separated from the fixed portion of the rim for the removal of the tire. Fig. 4 is a similar section showing the segment fitted into the movable portion of the rim and also a section of the closing plug obturating the aperture through which the segment is acted upon. Fig. 5 represents the segment open. Fig. 6 is a plan of the security bolt and of its operating pinion. Figs. 7 to 10 are views corresponding to Figs. 1 to 4 and illustrate another embodiment of the invention. Fig. 11 is a section on the line 11—11 in Fig. 7. Fig. 12 is a section on the line 12—12 in Fig. 10. Fig. 13 is a plan of the bolt fixing the lever on the rim. Fig. 14 is a section on the line 14—14 of Fig. 13.

Referring first of all to Figs. 1 to 6, 1 designates the fixed rim part or section on which the tire 15 provided with its air chamber 16 is fitted. On one side this rim part which is mounted on the felly 4 is provided with the usual lip or flange 1' for the reception of the beading of the tire, and on the other side of the metal is shaped to provide a U-shaped groove 1² in which the normally expanded segment 3 is housed. The separable rim part 2 is provided with the usual flange 2' for engagement with the bead of the tire. The fixed rim part 1 is also provided with a projecting ledge in which a small groove 13 is formed carrying a layer 13' of india rubber, leather or other plastic material. This plastic material forms a secure joint preventing the penetration of dust, mud or foreign bodies into the housing for the mechanism and the segment. Pivotally connected to one extremity of the segment 3 is a lever 18, which is connected to the other segment extremity by means of a link or rod 17. To positively lock the segment in its expanded position I provide a sliding bolt or bolts 12, movable within the guides 6, which bolts are normally urged between the segment 3 and the bottom of the groove 1² by means of suitable springs 8. The springs 8 are inserted into the guides 6 from the end of the same which is closed by means of a screwed plug 7, against which plug the spring 8 bears. The bolts 12 are provided with rack teeth along one side which are engaged by pinions 5 carried by rotatable keys 11 so that the sliding bolts 12 may be retracted at will against the action of the springs 8. To lock the bolt 12 in its retracted position projections upon the rotatable bolt 11 are forced into recesses or slots 24. A plug or plate 21 is provided for closing the space within which the lever 18 and connected parts operate. This plate 21 is provided with material 20 for making a secure joint, and is maintained in position by means of a nut 22 upon a pin 23 which is provided with a projection for engaging with the fixed rim part. The operation of this form of my invention is as follows: When it is desired to remove the tire from the wheel for the purpose of repair or the like, the keys 11 are operated to retract the sliding bolts 12 so that the segment 3 can be restricted. The plug or plate 21 is then removed and the lever 18 is moved until it assumes the position shown in Fig. 3, which, by reason of the connection 17, draws the ends of the segment 3 together and thus restricts the circumference of such segment and thereby releases the separable rim part 2. This rim part 2 may then be removed and the pneumatic tire can then be drawn off without difficulty. The operation of assembling the rim part is the reverse of the above operation and will be understood without further description.

In the embodiment of the invention illustrated in Figs. 7 to 14 the device for operating the segment $3^a$ comprises a control lever $18^a$ pivoted at $18'$ and comprising at $18^2$ a strong closing device producing a good joint. A slide block $18^3$ is provided which enables the double rod $17^a$ to move in the longitudinal slot $18^4$ formed therein. The closing means comprises a plate 29 having a spring outer end, and being provided with an operating knob 30. The other extremity of the plate 29 is reinforced by a tappet 32 riveted thereto and serving as a bolt. A hook 28 on the fixed rim part engages the tappet or projection 32, when the lever is in the closed position. When in this position, shown at Fig. 10, the plate 29 occupies such a position that the knob 30 coincides with the median plane of the said lever $18^a$. The rods $17^a$ are connected to one extremity of the segment $3^a$, and a link or rod 27 is connected to the other extremity, which link 27 is also pivotally connected to the rods $17^a$. These connections are so arranged that on the operation of the lever $18^a$, the rod 27 draws the extremity of the segment $3^a$, and reduces the circumference of same, while the rods $17^a$ exercise a similar action combined with a further action, at right angles thereto, which serves to press the extremity of the segment to which it is connected against the bottom of the groove $1^2$ in the fixed rim part $1^a$. This movement of the operating lever thus serves to free the separable rim part which can then be removed. The operation of this modified form of my invention is as follows: Assuming the operating lever $18^a$ is occupying the closing position (Fig. 10), the hook 28 is released by the operator by pulling the knob 30 away from the hook. The lever $18^a$ is then rocked and caused to assume the position indicated in Fig. 9 in which position it is retained by the hook 31. During this operation the rods $17^a$ and 27 under the influence of the lever $18^a$ act upon the ends of the segment $3^a$ and bring them to the bottom of the groove $1^2$. The detachable rim part $2^a$ is thus released and there is no difficulty in removing or refitting the pneumatic tire, which is finally secured by replacing the detachable rim part 2 and returning the lever $18^a$ to the position shown in Fig. 10.

As shown in Figs. 7 and 8 the two beads $2^3$ and $2^4$ of the detachable rim part bear upon the outer edges $1^3$ and $1^4$ of the housing of the segment $3^a$ in the groove $1^2$. The outer joint cover $2^2$ of the said detachable rim part $2^a$ assists in the formation of a good joint which is, however, insured by the joint $13'$ contained in the groove $13^a$.

What I claim and desire to secure by Letters Patent of the United States is:—

1. A wheel rim comprising in combination a fixed rim part, said rim part being formed to provide a substantially U-shaped groove at one edge of the said part, the outer wall of the said groove being nearer to the axis of the wheel than that portion of the rim part upon which the tire is carried, a projecting ledge from the said rim part, a layer of packing material upon the said projecting ledge, a separable rim part, an inwardly projecting flange from the said separable rim part adapted to bear against the said outer wall of the said groove, an extension of the said inwardly projecting flange adapted to press upon the said layer of packing material upon the said projecting ledge, a segment adapted to fit within the groove in the movable rim part, pivoted lever means for expanding the said segment to lock the parts in assembled relation, and means for wedging the said expanded segment in position within the said groove in the said movable rim part.

2. A wheel rim comprising in combination a fixed rim part formed with a groove at one edge of the same, a flange on the outer wall of the said fixed rim part, a segment, and means for expanding and wedging the said segment within the groove in the inner face of the movable rim part, comprising an operating lever formed with a longitudinal slot, a pair of levers connected at one of each of their extremities to one end of the said segment, their other extremities being connected by a pin sliding within the said slot, a link connected at one end to said pair of levers, its other end being attached to the other extremity of the segment and a block carried on the inner face of the said operating lever adapted when the segment is expanded to engage the under face of the said link and maintain the same and consequently the segment in position within the said groove in the movable rim part.

In testimony whereof I affix my signature in presence of two witnesses.

EUGÈNE LAURENT.

Witnesses:
    OCTAVE ROBERT,
    JEAN GERMAIN.